United States Patent [19]

Koike et al.

[11] Patent Number: 5,738,073

[45] Date of Patent: Apr. 14, 1998

[54] ENGINE OPERATION CONTROL SYSTEM

[75] Inventors: Takashi Koike; Kazumasa Itoh, both of Hamamatsu, Japan

[73] Assignee: Sanshin Kogyo Kabushiki Kaisha, Shizuoka-ken, Japan

[21] Appl. No.: 745,125

[22] Filed: Nov. 8, 1996

[30] Foreign Application Priority Data

Nov. 8, 1995 [JP] Japan .................................. 7-289789

[51] Int. Cl.⁶ ................................................ F02P 5/14
[52] U.S. Cl. .................................. 123/421; 123/198 DC; 123/65 PE
[58] Field of Search ........................... 123/421, 630, 123/335, 417, 198 DC, 90.15, 65 PE

[56] References Cited

U.S. PATENT DOCUMENTS

| | | | |
|---|---|---|---|
| 4,459,951 | 7/1984 | Tobinaga et al. | 123/198 DC |
| 4,606,315 | 8/1986 | Tobinaga et al. | 123/417 |
| 4,695,822 | 9/1987 | Furukawa | 123/335 |
| 4,790,279 | 12/1988 | Tobinaga et al. | 123/417 |
| 4,895,120 | 1/1990 | Tobinaga et al. | 123/417 |
| 4,966,115 | 10/1990 | Ito et al. | 123/418 |

*Primary Examiner*—Willis R. Wolfer
*Assistant Examiner*—Hieu T. Vo
*Attorney, Agent, or Firm*—Knobbe, Martens, Olson & Bear, LLP

[57] ABSTRACT

An engine operation control system for an engine having at least one variable volume combustion chamber with an ignition element corresponding thereto and an exhaust port for controlling the flow of exhaust from the chamber is disclosed. Upon detection of an engine overheat condition, the operation control system operates to advance the timing of the firing one or more of the ignition elements and misfiring these elements, whereby engine cooling is achieved without backfire.

11 Claims, 8 Drawing Sheets

ENGINE OPERATION CONTROL SYSTEM

FIELD OF THE INVENTION

The present invention relates to an engine operation control system of the type which controls ignition timing.

BACKGROUND OF THE INVENTION

Engines of the type which power personal watercraft are often two-cylinder, two-cycle type engines. The exhaust generated by the engine is routed through an exhaust pipe to a water lock. The water lock allows the exhaust gas to be discharged into the water but prevents water from entering the exhaust system and the engine.

Sometimes these engines overheat. In those engines which employ an electronic ignition control, one convenient method for lowering the temperature of the engine is to misfire one or both of the cylinders. Misfiring prevents substantial combustion in the cylinder and results in lower engine rpm, thus lowering the heat generation of the engine. Further, the movement of the unburned fuel and air components through the cylinder contributes to engine cooling.

A problem exists in using engine misfire as the means to cool the engine. Namely, misfire results in unburned fuel being expelled into the exhaust pipe. This unburned fuel sometimes ignites in the exhaust pipe, causing a backfire. Firing within the exhaust pipe may damage the engine or the water lock. In order to prevent damage to the water lock, designers typically make them strong enough to withstand the backfire. This has the drawback that the water pipe is then more expensive to manufacture and heavy, adding undesirably to the cost and weight of the personal watercraft.

An engine control is needed whereby a misfire mode may be employed for cooling the engine which at the same time avoids firing of uncombusted combustion products with the exhaust pipe.

SUMMARY OF THE INVENTION

In accordance with the present invention, there is provided an engine operation control system. The engine operation control system is preferably utilized with an engine of the type which includes at least one variable volume combustion chamber having an ignition element corresponding thereto.

The engine operation control system has an overheat mode for cooling the engine in the event overheating is detected. In accordance with this mode, when engine overheat is detected, the engine operation control system advances the firing timing of one or more of the ignition elements and the elements are misfired. Optimally, the engine operation control system may retard the opening of an exhaust port controlling the flow of exhaust from the chamber at the same time.

Further objects, features, and advantages of the present invention over the prior art will become apparent from the detailed description of the drawings which follows, when considered with the attached figures.

DETAILED DESCRIPTION OF THE PREFERRED EMBODIMENT

Figure 1:
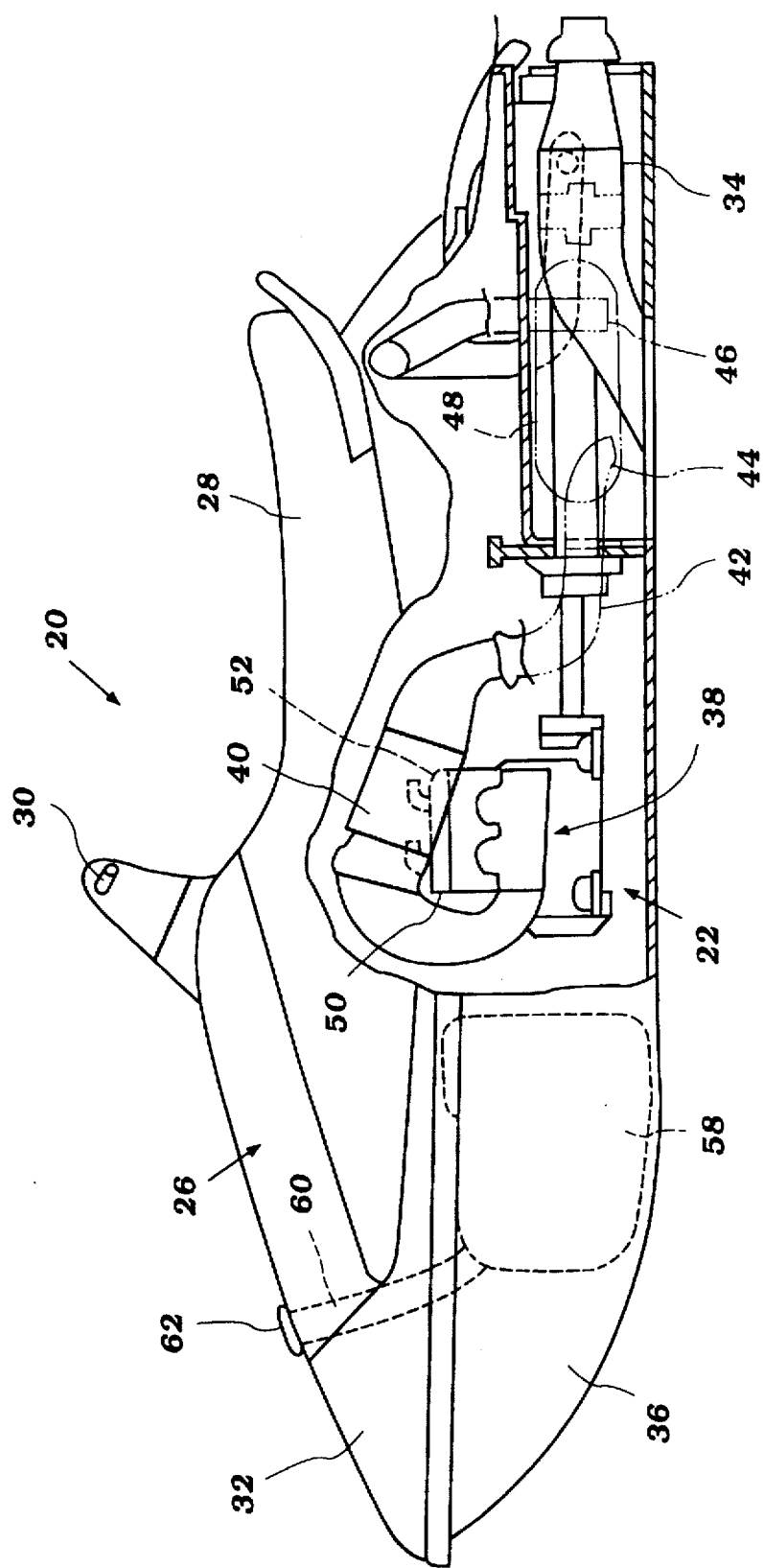
FIG. 1 is a side view, in partial cross-section, of a watercraft containing an engine of the type with which the engine operation control system of the present invention is useful.

FIG. 1 illustrates a watercraft 20 powered by an engine 22 of the type with which an engine operation control system 24 (see FIG. 5) in accordance with the present invention is useful. In general, the watercraft 20 includes a hull 26 having a top portion 32 and a lower portion 36. A seat 28 is positioned on the top portion 32 of the hull 26. A steering handle 30 is provided adjacent the seat 28 for use by a user in directing the watercraft 20.

The hull 26 defines therein an interior space in which is positioned the engine 22. The engine 22 has an output which rotationally drives a propulsion unit 34 which extends out a rear end of the lower portion 36 of the hull 26.

Fuel is supplied to the engine 22 from a fuel tank 58 positioned within the hull 26 of the watercraft 20 forward of the engine 22. This fuel tank 58 has a fill line 60 extending to an external port 62. Fuel is supplied from the tank 58 to the engine 22 through an appropriate fuel line (not shown). A combustion air supply is also provided to the engine 22 for use in the fuel combustion process.

Exhaust gas generated by the engine 22 is routed from the engine to an exhaust manifold 38. The exhaust manifold 38 extends to a muffler 40, which in turn has an exhaust pipe 42 extending therefrom. The exhaust pipe 42 comprises front and rear halves, with the downstream or free end 44 of the front half and the upstream end 46 of the rear half positioned within a water lock 48 formed in the lower portion 36 of the hull 26. This configuration of the exhaust pipe 42 prevents water from entering the engine 22. Exhaust passes through the manifold 38 and muffler 40 to the exhaust pipe 42 and from there is expelled into the water.

Figure 2:
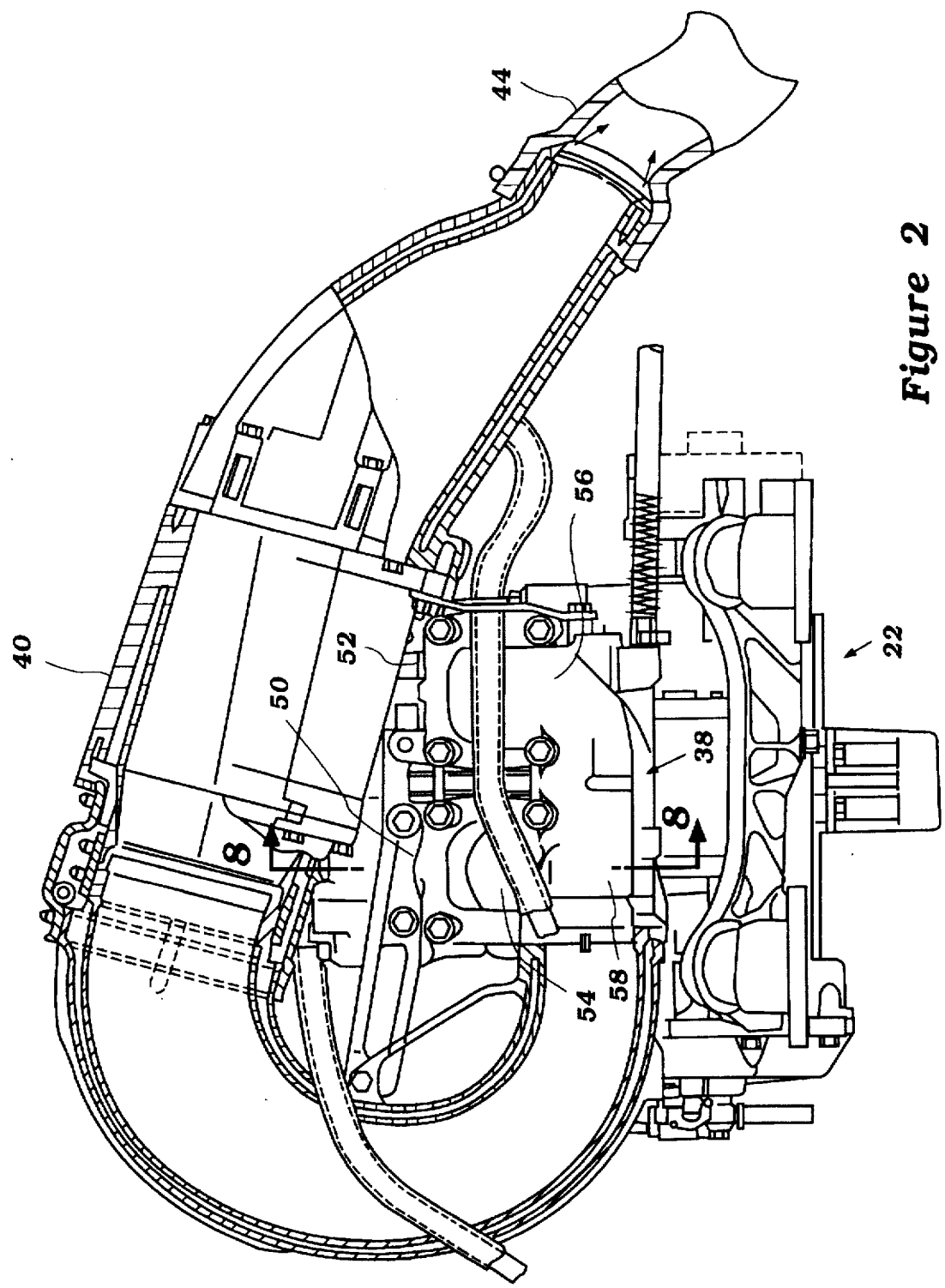
FIG. 2 is a side view, in partial cross-section, of the engine illustrated in FIG. 1.
Figure 3:
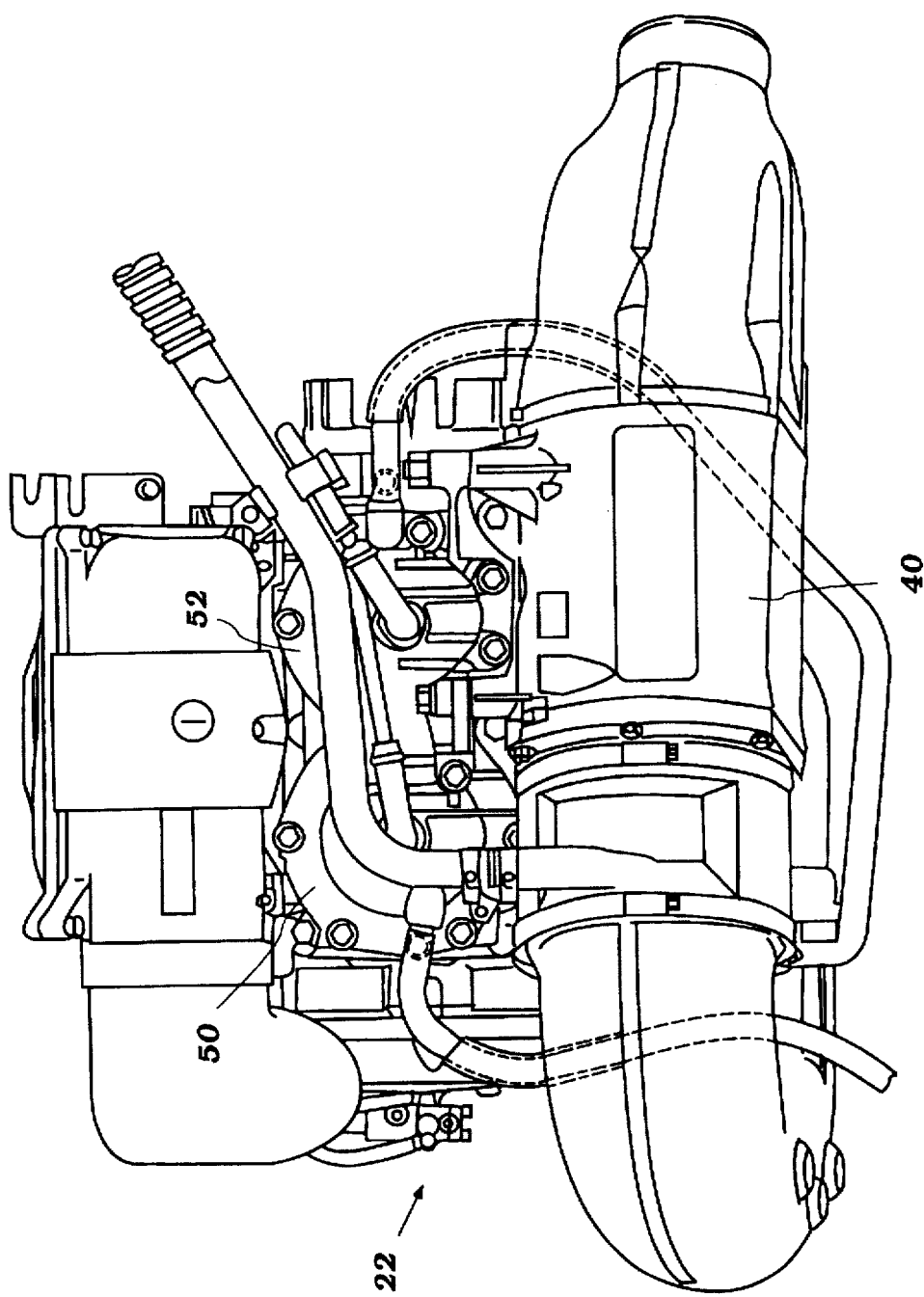
FIG. 3 is a top view of the engine illustrated in FIG. 2.
Figure 4:
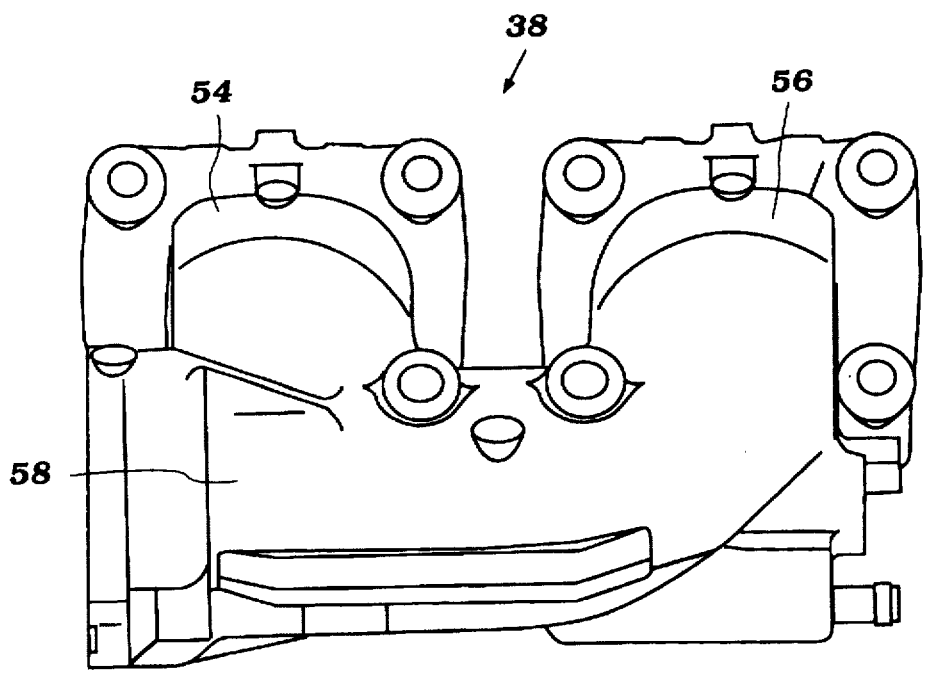
FIG. 4 is a side view of an exhaust manifold of the engine illustrated in FIG. 1.

As best illustrated in FIGS. 2–4, the engine 22 is preferably of the two-cylinder, two-cycle variety. One skilled in the art will appreciate that the engine operation control system 24 of the present invention may be adapted for use with engines of other types and configurations.

The engine 22 has a first or front cylinder 50 and a second or rear cylinder 52 with reference made to the position of the engine 22 within the hull 26 of the watercraft 20 as illustrated in FIG. 1. As best illustrated in FIGS. 2 and 4, the exhaust manifold 38 includes a first branch 54 which extends in communication with an exhaust outlet passage from the front cylinder 50, and a second branch 56 which extends in communication with an exhaust outlet passage from the second cylinder 52. These two branches 54,56 join at a joining portion 58 which is positioned adjacent the front cylinder 50.

In this exhaust system arrangement, exhaust efficiency is greater for the second or rear cylinder 52 than the front cylinder 50. As such, the rear cylinder 52 requires a greater amount of air/fuel mixture and the power and exhaust output of that cylinder are greater than the front cylinder 50. For the same reason, however, combustion temperatures are likely to be higher in the second cylinder 52 as compared to the first cylinder 50, and knocking is more likely to occur in the second as compared to the first cylinder.

A valve 49 is provided corresponding to each exhaust port 51 corresponding to each cylinder 50,52. These exhaust valves 49 open and close, controlling the flow of exhaust from each cylinder 50,52 into the exhaust passages and exhaust manifold 38. As is well known to those skilled in the art, the timing of the opening and closing of these valves 49 is preferably such that the exhaust start timing is retarded at low engine rpm and advanced during higher engine rpm conditions. Further, as disclosed in more detail below, when the engine 22 is being run in a controlled mode, such as when the engine is overheating and a misfire mode is adopted, means may be provided for changing the exhaust start time and the exhaust start time may be significantly retarded to lower the exhaust gas temperature and aid in preventing combustion of unburned exhausted components within the exhaust pipe.

Figure 5:
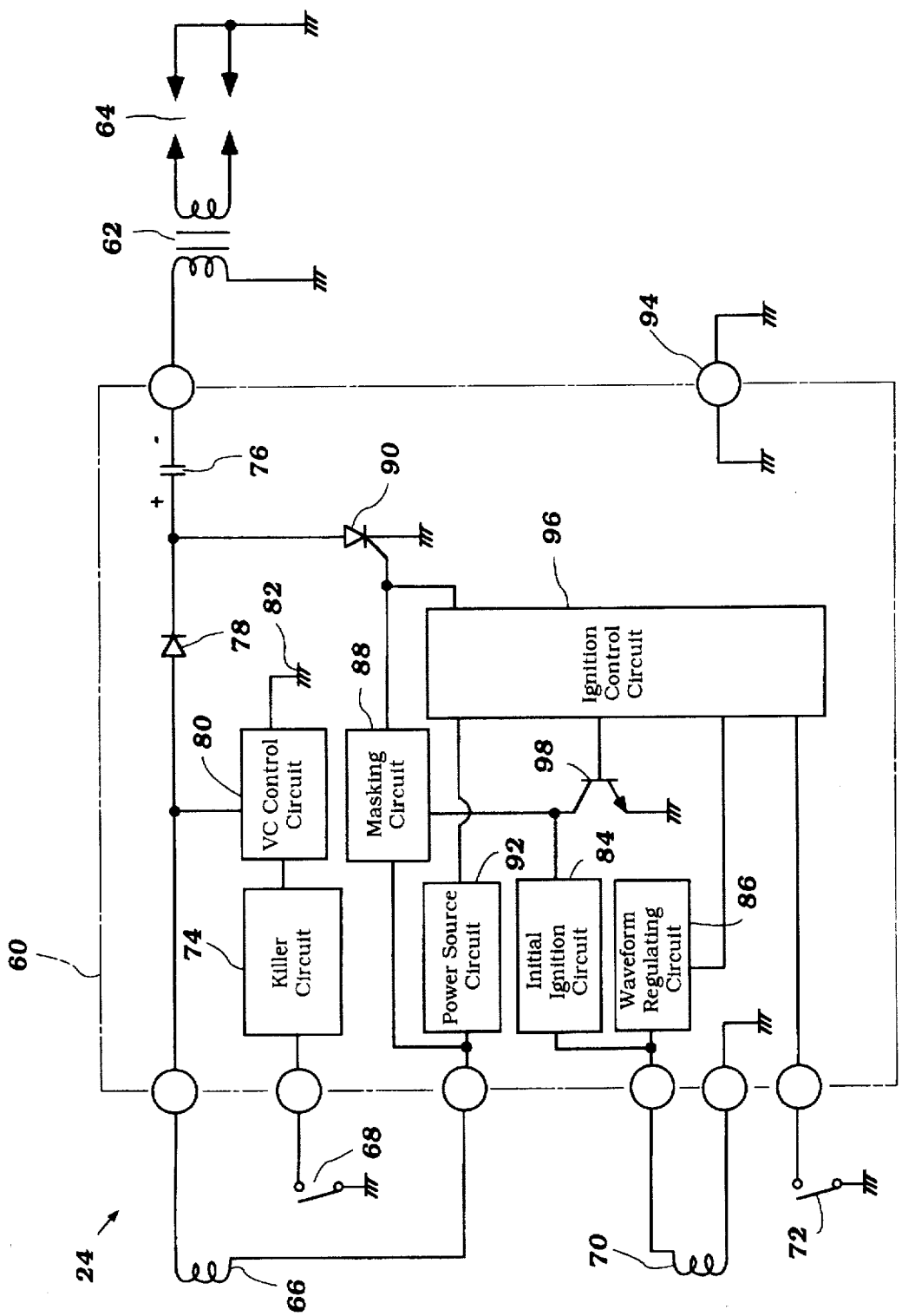
FIG. 5 is a diagram illustrating the engine operation control system of the present invention used with the engine illustrated in FIG. 1.

FIG. 5 best illustrates the engine operation control system 24 in accordance with the present invention. As illustrated therein, a charging coil 66 is provided for generating an ignition current. This ignition current is supplied to an ignition coil 62 and thereon to an ignition or spark plug 64 corresponding to each of the front and rear cylinders 50,52.

The system 24 of the present invention includes an ignition control system 60 for controlling the ignition timing of the ignition coil 62 and ignition or spark plug 64. The system 24 also includes a kill switch 68 for shutting down the engine 22, a pulser coil 70 for generating an ignition timing current, and a thermosensor 72 for detecting engine overheating.

The pulser coil 70 is preferably of the "outer" type, comprising a coil disposed outwardly of a flywheel (not illustrated) rotatably driven by the crankshaft of the engine 22. The flywheel has one or more projections (not illustrated) on the outer periphery thereof for inducing a current in the coil of the pulser coil 70. The system 24 of the present invention preferably includes a pulser-type coil 70 as the wave form of the pulse therefrom varies little even when the engine rpm varies. Projections may also be formed on the flywheel for inducing pulses in the pulser coil 70 for use in determining engine speed and the position of the piston in each cylinder 50,52.

The ignition control system 60 includes a capacitor 76 for storing an ignition charged from the charging coil 66 and a diode 78 for preventing the reverse or inverse flow of the electric charge stored in the capacitor 76. A voltage control circuit 80 is provided for regulating the current to the capacitor 76 by relieving, if necessary, part of the current from the charging coil 66 to a ground 82. A kill circuit 74 operates the kill switch 68 for grounding out the ignition system and shutting down the engine 22.

In accordance with the system 24 of the present invention, the ignition timing is controlled in a first and a second ignition control mode. In general, in the first ignition control mode, the system 24 controls the ignition timing in a predetermined manner which is independent of the sensed rotational speed of the engine. In the second ignition control mode, the system 24 controls the ignition timing primarily in accordance with required engine performance for the sensed engine speed, where the ignition advance for the ignition element of each cylinder varies to provide optimum engine performance.

In accordance with the engine operation system 24 of the present invention, the ignition control system 60 includes an initial ignition circuit 84 for carrying out the first ignition control mode. Here, the pulser coil 70 output is input into the initial ignition circuit 84. The initial ignition circuit 84 manipulates the output of the pulser coil 70 to control the ignition pulse timing signal. The output of the initial ignition circuit 84 is outputted to a wave form regulating circuit 86 which converts ignition pulse timing signal into a rectangular wave output. This signal is further processed by a masking circuit 88 which masks cylinder distinguishing signals. This output signal is utilized to control a thyristor 90, which in turn controls the flow of primary current from the generating coil 66 to the ignition coil 62.

The first ignition control mode is preferably operated from engine 22 idle speed up to a predetermined low engine speed, as described in more detail below. During this mode of operation, the ignition timing as controlled by the initial ignition circuit 84 is independent of the engine rpm as sensed by the pulser coil 70 in relation to the flywheel speed.

The engine operating control system 24 of the present invention includes other circuit apparatus for accomplishing the second ignition control mode of the present invention. This circuitry includes an ignition control circuit 96 which controls ignition timing according to required engine performance characteristics corresponding to a sensed engine rpm, and not with reference to the preset initial ignition circuit 84.

As illustrated, the ignition control circuit 96 is powered by a power source circuit 92. A ground 94 is provided corresponding to the ignition control circuit 96. Also provided is a transistor 98 positioned between the initial ignition circuit 84 and the ignition control circuit 96.

In general, the ignition control circuit 96 utilizes the transistor 98 to prevent the operation of (by grounding) the initial ignition circuit 84. The output of the pulse coil 70 is passed through the wave form regulating circuit 86 and masking circuit 88 described above. The ignition control circuit 96 turns on and off the thyristor 90 for controlling the primary current flow from the charging coil 66 to the ignition coil 62. In particular, when a current pulse from the pulser coil 70 is inputted to the ignition control circuit 84, the ignition control circuit turns on thyristor 90. This has the effect of grounding or stopping the primary current flow from the charging coil 66 to the ignition coil 62. When the ignition control circuit 96 turns off the thyristor 90, primary current flows from the charging coil 66 to the ignition coil 62, firing the ignition plug 64.

The ignition control system 60 preferably includes a thermosensor 72. The thermosensor 72 provides engine temperature data to the ignition control system 60. As described below, when the thermosensor 72 indicates an engine overheating condition, the ignition control system 60 preferably adopts a misfire condition for reducing engine temperature. At the same time as the ignition misfire condition is adopted, an exhaust valve opening start time adjustment may be made. Namely, the exhaust valve opening start time is retarded or delayed. In this manner, exhaust component temperature is lowered and the percentage of unburned components reduced, so as to reduce the possibility of firing of unburned and exhausted components within the exhaust pipe.

Figure 6:
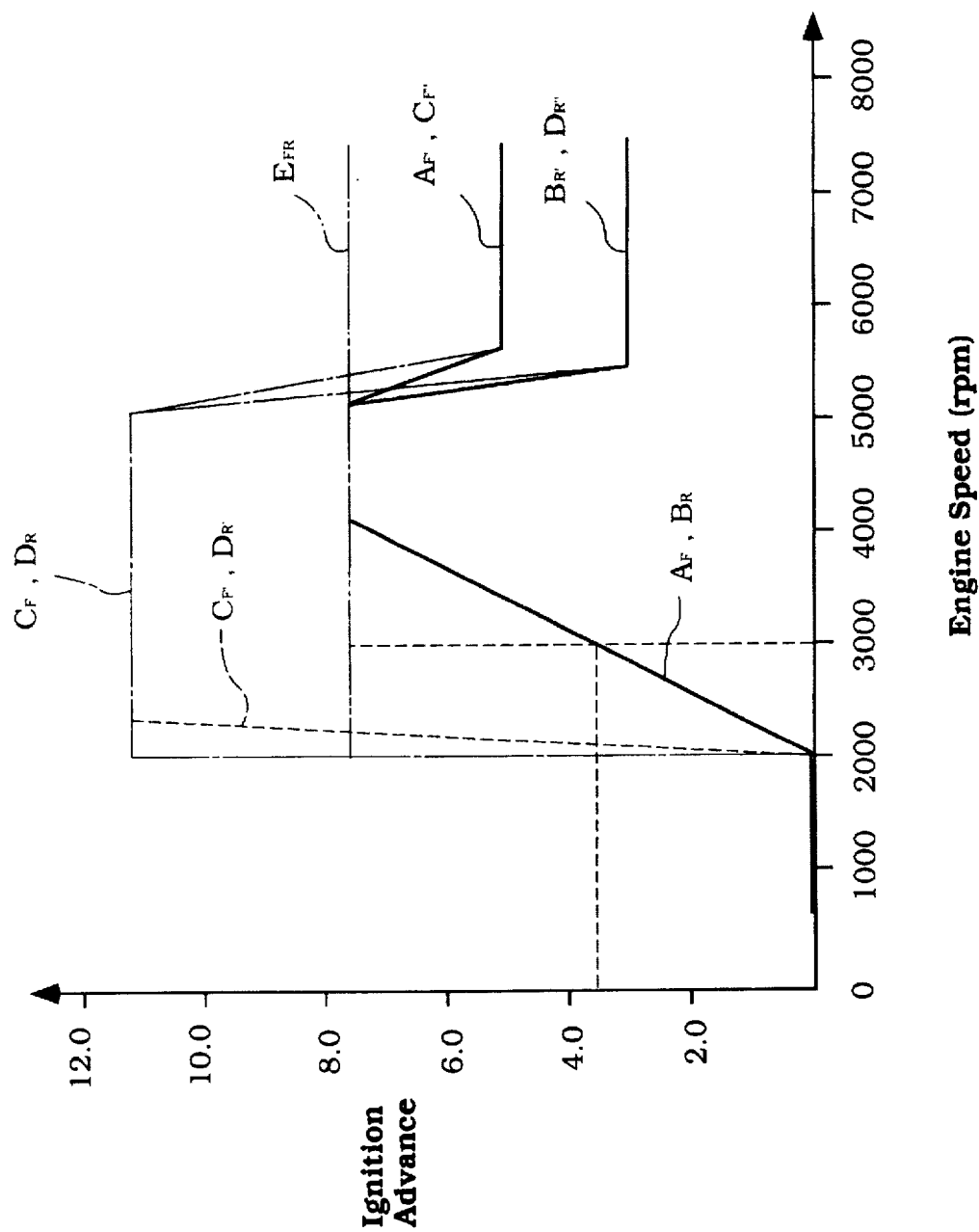
FIG. 6 graphically illustrates the relationship of ignition advance to engine speed employed by the engine operation control system of the present invention.
Figure 7:
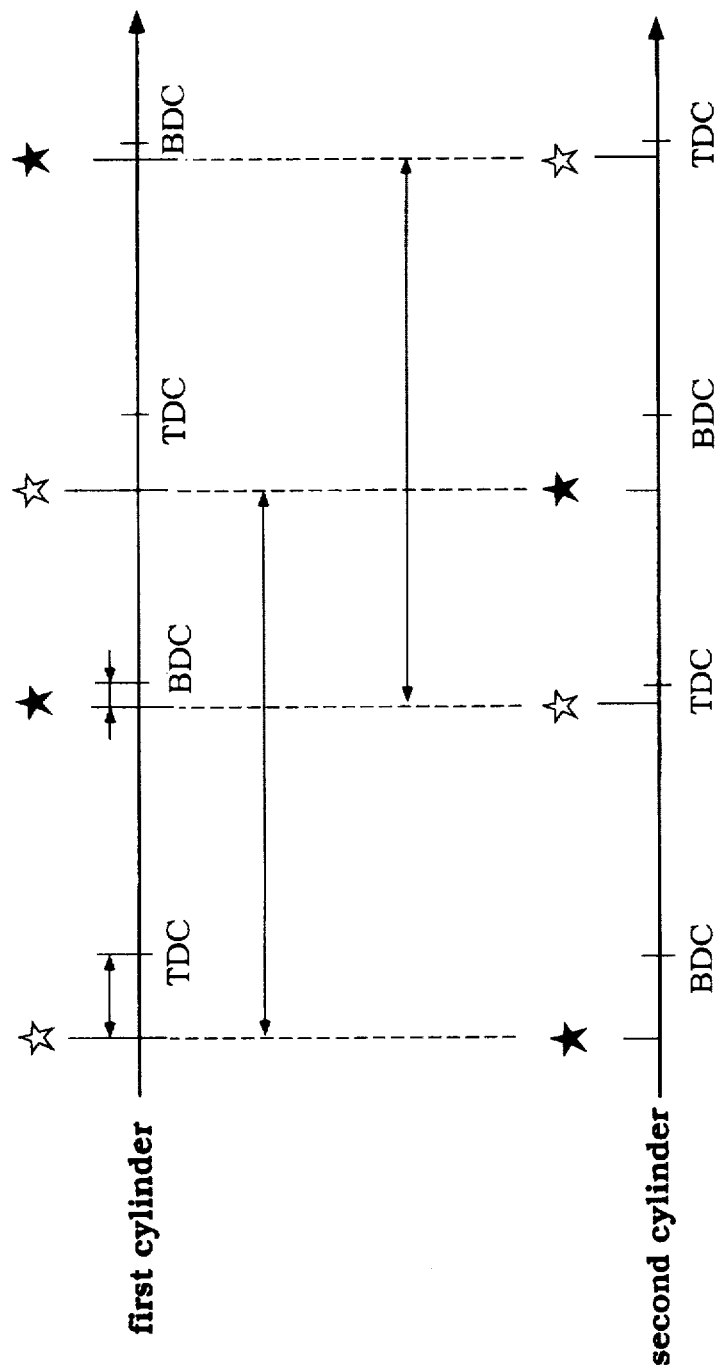
FIG. 7 illustrates the ignition timing of each cylinder of the engine illustrated in FIG. 1 employing the engine operation control system of the present invention.
Figure 8:
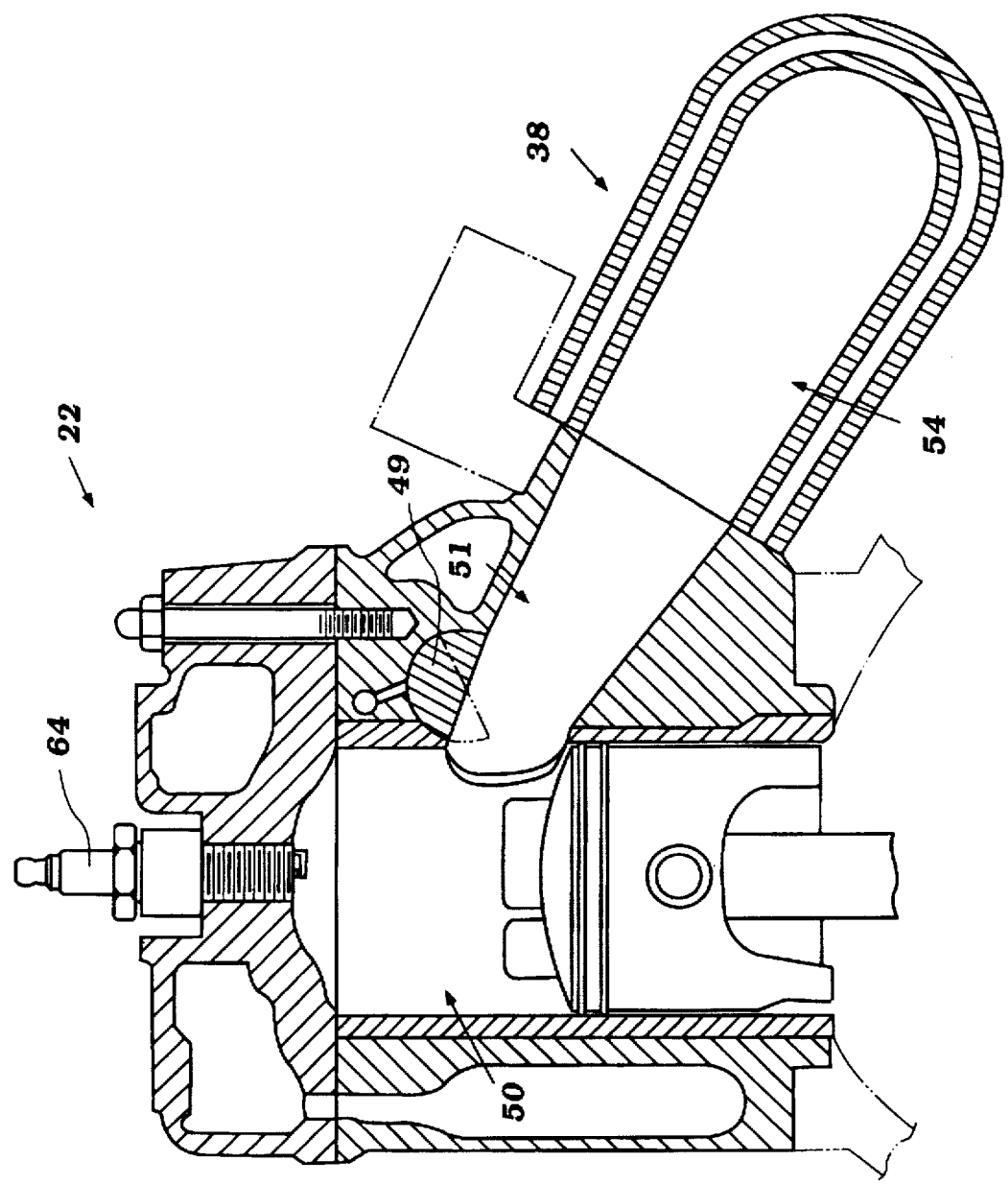
FIG. 8 is a partial cross-sectional view of the engine illustrated in FIG. 2 taken along line 8—8 therein.

Preferably, the initial ignition and ignition control circuits 84,96 are configured to operate such that the ignition timing is as illustrated in FIGS. 6 and 7. FIGS. 6 and 7 illustrate graphically certain characteristics for the engine 22 operated with the engine operation control system 24 described above. It will be understood to those skilled in the art that the engine speeds set forth below are merely representative and could vary from the values set forth therein.

FIG. 6 illustrates the relationship of engine speed (RPM) and the ignition timing (advance, in crank angle degrees). In this figure, fifteen degrees (15°) before top dead center (BTDC) is preferably taken as zero degrees (0°) advance. Characteristic curves $A_F$ and $B_R$ (again, where "F" indicates that the curve corresponds to the "front" or first cylinder 50 and the "R" indicates that the curve corresponds to the "rear" or second cylinder 52) correspond to when the engine is operated in the first ignition control mode. Characteristic curves $C_F$ and $D_R$ correspond to when the engine is operated in the second ignition control mode. Characteristic curve $E_{F,R}$ corresponds to an engine operation condition where the engine is overheated.

In accordance with the engine operation control system 24 of the present invention, when the engine 22 is started and in the engine operating range from idling speed (for example, 1500 rpm) up to a predetermined low engine speed (for example, 2000 rpm), the system 60 controls the ignition timing in accordance with the first ignition control mode. Herein, the ignition control circuit 96 turns off the transistor 98. Transformed pulse signals from the pulser coil 70 are supplied from the initial ignition circuit 84 through the masking circuit 88 to the thyristor 90 in a manner by which the ignition timing is controlled so as to be constant. This ignition timing is controlled based on the overall engine rpm, and not the pulse signal generated by the pulser coil 70, which may vary in frequency during each flywheel revolution. During this mode of operation, the ignition timing is preferably the zero or baseline setting. In the preferred embodiment, this baseline setting corresponds to an ignition advance of fifteen degrees (15°), as stated above.

As best illustrated by the curves labelled $A_F$ and $B_R$ (where "F" indicates that the curve corresponds to the "front" or first cylinder 50 and the "R" indicates that the curve corresponds to the "rear" or second cylinder 52) in FIG. 6, when the engine speed exceeds the predetermined low speed (ex. 2000 rpm), the system 20 controls the ignition timing in accordance with the second ignition control mode. Herein, the ignition control circuit 96 turns on the transistor 98, thereby grounding the initial ignition circuit 84. The pulser coil 70 supplies a pulse signal (which is manipulated by the wave form regulating circuit 86) to the ignition control circuit 96 for turning on and off the thyristor 90. The ignition control circuit 96 manipulates the state of the thyristor 90 so as to increase the ignition timing advance angle as the engine speed increases. Preferably, in the second mode of operation, the maximum ignition advance is seven degrees (7°) (i.e. 22° BTDC), with this ignition timing advance angle maintained to speeds exceeding a predetermined high engine speed, such as 4000 rpm.

If the engine 22 is rapidly accelerated from idling to high rpm, a similar control strategy is employed. At engine speeds up to a predetermined low speed (for example, 2000 rpm) the ignition timing is kept at the baseline or "zero" rpm ignition advance (i.e.15 E BTDC in the preferred embodiment) by the initial ignition circuit 84. Once the engine speed exceeds the predetermined low speed, the ignition control circuit 96 advances the ignition timing up to a maximum advance of eleven degrees (11°) (i.e. 26° BTDC). This operational mode is illustrated by the curves $C_F$ and $D_R$ in FIG. 6. It will be understood that some time may elapse during which the ignition advance is advanced to this eleven degree (11°) value, as illustrated by the characteristic curves $C'_F$ and $D'_R$ in FIG. 6.

If engine 22 overheating is detected by the thermosensor 72, such as at engine speeds of over 4000 rpm, the ignition control circuit 96 turns on and off the thyristor 90 in a manner whereby the ignition mechanisms corresponding to the first and second cylinders 50,52 are alternatively missed, so as to lower the engine rpm (for example, to 3000 rpm). In this instance, the advance of the ignition timing at the operating cylinders (both cylinders 50,52) is controlled, as illustrated by the characteristic curve $E_{F,R}$ in FIG. 6, to be seven and one-half degrees (7.5°). This ignition advance value is preferably larger than the ignition advance in normal engine operation (which, as illustrated by characteristic curves $A_F$ and $B_R$, would normally be about 3.5° at 3500 engine rpm). In addition, along with the ignition timing control, the exhaust control valve is preferably controlled so that the exhaust starting timing is retarded from the ordinary one corresponding to the engine speed of 3000 rpm.

Whether the engine 22 is being operated normally or in a mode of acceleration (i.e. curves $A_F$, $B_R$, $C_F$ or $D_R$), the ignition advance is reduced when the engine speed exceeds a very high engine rpm (ex. 5100 rpm) for the primary purpose of preventing knocking from occurring. In this case, the ignition advance is preferably set larger for the first cylinder 50 as compared to the second cylinder 52. In a preferred embodiment, the ignition advance for the first cylinder 50 is five degrees (5°) (i.e. 20° BTDC) and three (3°) (i.e. 18° BTDC) for the second cylinder 52. The characteristic curves of these ignition advance states are illustrated as curves $A_F'/C_F"$ and $B_R'/D_R"$ in FIG. 6.

When the engine speed exceeds a predetermined high speed (ex. 5100 rpm) the first cylinder 50 is thus effectively ignited at twenty degrees (20°) before top dead center and ineffectively ignited at eighteen degrees (18°) before bottom dead center. On the other hand, the second cylinder 52 is effectively ignited at eighteen degrees (18°) before top dead center and ineffectively ignited at twenty degrees (20°) before bottom dead center. In other words, since the first cylinder 50 (which has a low exhaust gas dischargeability) is ineffectively ignited when the exhaust gas is more completely discharged, bridging (i.e. short-circuiting) of the ignition spark plug gap can be prevented.

FIG. 7 illustrates the ignition timings of the ignition elements corresponding to the first and second cylinders 50,52, respectively, at this high engine speed. In this figure, the white star marks show the effective ignition firings and the black star marks indicate ineffective ignition timings. The engine control fires both elements simultaneously, one cylinder fired effectively and the other ineffectively.

Advantageously, however, the effective firing of each cylinder 50,52 is optimized even though both cylinders are fired simultaneously. As illustrated, the first cylinder 50 is effectively fired twenty degrees (20°) before top dead center thereof (and the second cylinder 52 is ineffectively fired at the same time at eighteen degrees before bottom dead center), while the second cylinder 52 is effectively fired eighteen degrees (18°) before top dead center thereof (and the first cylinder 50 is ineffectively fired at the same time at twenty degrees before bottom dead center). In this arrangement, the interval between each effective firing of the first cylinder 50 is spaced by one-hundred eighty degrees (180°), as are the effective firings of the second cylinder 52. When utilizing the ignition advances set forth above, the interval between the effective firing of the first cylinder 50 and effective firing of the second cylinder 52 is, however, more than the hundred eighty degrees (180°) and the interval between the effective firing of the second cylinder 52 and the next effective firing of the first cylinder 50 is less than one hundred eighty degrees (180°). Of course, one skilled in the art will appreciate that these intervals will change dependent upon the firing advance utilized for the effective firing of each cylinder 50,52.

The system 24 and its method of use in conjunction with an engine 22 has numerous advantageous over the prior art. First, the system 24 of the present invention allows for independent effective ignition timings of the first and second cylinders 50,52. In this manner, ignition timing can still be controlled so as to correspond to the required firing characteristics of each cylinder and obtain optimum engine performance. At the same time, the system 24 is arranged such that both cylinders are ignited simultaneously, avoiding the need for a distinguishing apparatus. Still further, the advance angle of the ineffective ignition from BDC (bottom dead center) of the first cylinder 50 may be made smaller than that of the second cylinder 52, whereby the ineffective ignition timing of the first cylinder becomes later and short-circuiting of the ignition plug by the unburned component in the exhaust gas is prevented (as a result of the fact that the ineffective ignition is carried out in the first cylinder after the exhaust gas has been discharged).

Further, as disclosed above, the wave form of the signal produced by the "outer" type pulser coil 70 disclosed above does not change significantly with respect to engine speed. In this manner as well, fluctuation in ignition timing is prevented.

Since the ignition timing is advanced to its maximum advance angle when the engine 22 is accelerated from idling, the acceleration responsiveness of the engine is improved. In particular, since the advancing is carried out only after the engine speed reaches a predetermined low speed which is higher than the idle speed, an engine speed fluctuation during the idling is not mistaken to be an increase in engine speed resulting from the start of acceleration.

In accordance with the operating system of the present invention, in the high speed engine operating range (for example, 5100 rpm or more) ignition advance is reduced. This reduction in ignition advance has the effect of reducing the occurrence of knocking. Notably, the ignition advance corresponding to the second cylinder 52 is smaller than that corresponding to the first cylinder 50, due to the fact that the second cylinder 52 discharges more exhaust gas, produces more power, takes in more air and is otherwise more susceptible to knocking.

Still further, when engine overheating is detected, the ignition advance of the operating cylinders 50,52 is made larger than the ignition timing which would normally be employed for the same engine speed under normal operating (i.e. no overheating) condition. At the same time, the engine rpm is lowered by misfiring the cylinders and thus suspending ignition. At the same time, the exhaust valve start time may be retarded. In this arrangement, the exhaust gas temperature is lowered, but at the same time, the gas is nearly fully combusted, and does not combust in the exhaust system (i.e. no backfire occurs).

It should be understood by one skilled in the art that the system 24 could be arranged so that the ignition firing is optimized at all engine speeds, instead of just an operational speed above a predetermined speed. In addition, the exact ignition timing advance values and/or engine speed values may vary from those which are given by way of illustration above, depending upon the type of engine and its application.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. An engine operation control system for use with an engine having at least one variable volume combustion chamber and an ignition element for initiating combustion of an air/fuel mixture within said chamber, said operation control system comprising means for detecting an engine overheat condition, a means for providing an adjusted firing advance in response to said means for detecting indicating an overheat condition, a means for misfiring said ignition element based upon said adjusted firing advance and means for retarding the opening of an exhaust port controlling the flow of exhaust from said chamber upon detection of an overheat condition.

2. The engine operation control system in accordance with claim 1, wherein said operation control system includes an electronic ignition control, said electronic ignition control including a pulser coil for generating ignition pulses.

3. The engine operation control system in accordance with claim 1, wherein said means for providing an adjusted firing advance adjusts said advance to be larger than normal when said overheat condition is indicated.

4. The engine operation control system in accordance with claim 3, wherein said misfiring is accomplished by substantially advancing the firing of said ignition element.

5. The engine operation control system in accordance with claim 1, wherein said means for retarding the opening of an exhaust port comprises a valve.

6. A method for cooling an engine upon overheating, said engine having at least one variable volume combustion chamber, an exhaust port leading from said chamber through which exhaust flows, and an ignition element corresponding to said chamber, comprising the steps of:

detecting an engine overheat condition and in response thereto, adjusting the timing of ignition firing;

firing said ignition element so as to cause misfire thereof; and retarding the opening of the exhaust port and thus retarding the flow of exhaust from said chamber.

7. The method in accordance with claim 6, wherein said adjusting step comprises advancing the ignition time of said ignition element.

8. The method in accordance with claim 7, wherein said advancing is of a greater amount than advancing utilized in a normal engine operating condition.

9. An engine operation control system for use with an engine having at least one variable volume combustion chamber and an ignition element for initiating combustion of an air/fuel mixture within said chamber, said operation control system comprising a means for detecting an overheat condition, a means for misfiring said ignition element upon detecting an engine overheat condition, and a means for retarding the opening of an exhaust port controlling the flow of exhaust from said chamber upon detecting an overheat condition.

10. The engine operation control system in accordance with claim 9, wherein said means for retarding the opening of an exhaust port comprises an exhaust valve.

11. The engine operation control system in accordance with claim 9, wherein said means for misfiring comprises means for advancing and firing of said ignition element.

* * * * *